June 23, 1936.   F. O. SWANLAND   2,044,921
TWO-WAY HOSE CHECK VALVE
Filed July 17, 1935
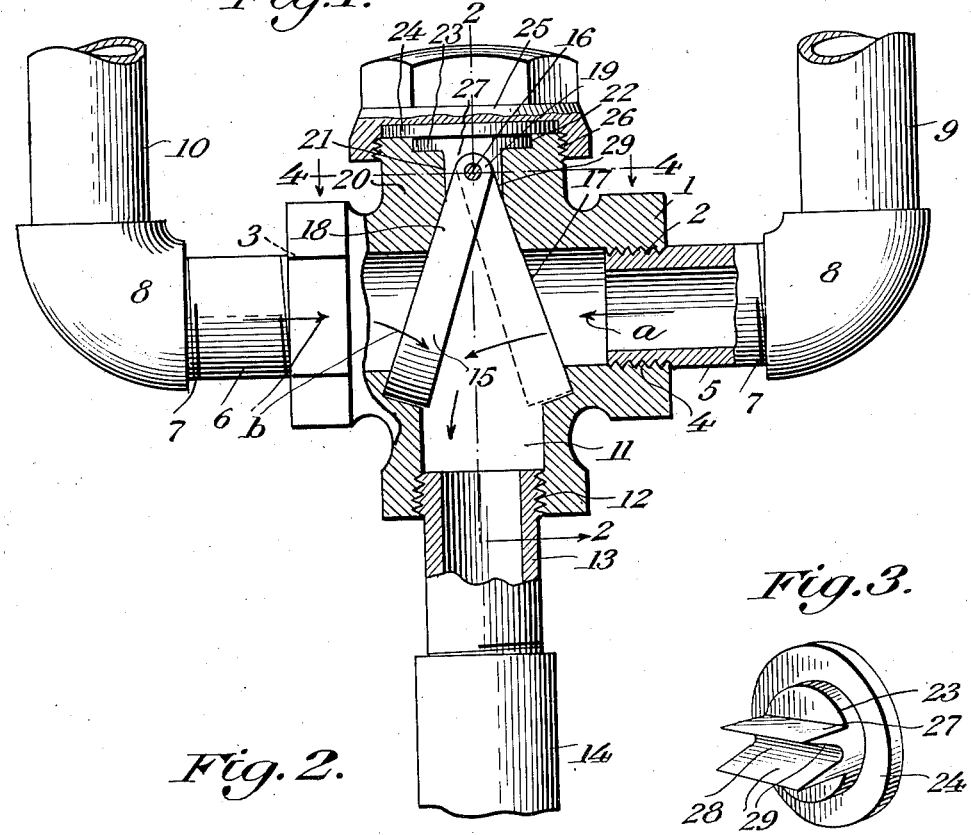
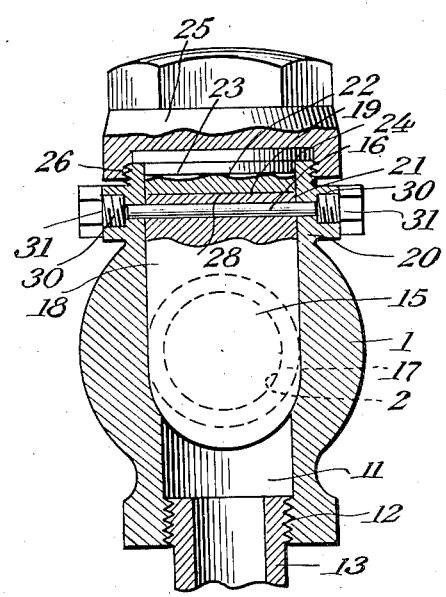
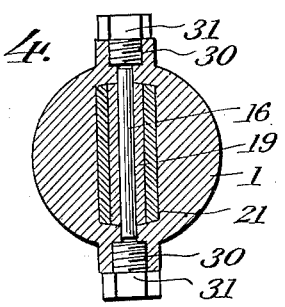
Frederick O. Swanland
INVENTOR
BY Victor J. Evans & Co.
ATTORNEYS Patented June 23, 1936

2,044,921

UNITED STATES PATENT OFFICE 2,044,921

TWO-WAY HOSE CHECK VALVE

Frederick O. Swanland, Philadelphia, Pa.

Application July 17, 1935, Serial No. 31,895

1 Claim. (Cl. 251—118)

This invention relates to an improved two-way hose check valve, and while it may be used in connection with any equipment for the distribution of any suitable fluid, it is especially adapted for use in dairies, breweries, soft drink plants, and any place with a fluid distribution equipment, where it is essential for the use of hot and cold water for washing floors and equipment. This type of two-way hose check valve is designed to be used in lieu of the standard check valves now used individually on hot and cold water pipes, when both pipes are connected to a T fitting having a hose connected thereto. This type of two-way hose check valve can also be connected directly to tanks or other receptacles.

Another purpose is to provide a valve of this kind, wherein the metal swing check valve proper may operate in simulation to a pendulum and be ground on each side and to engage opposed ground seats of the valve body and therefore provide for water tight engagement or joint when the pendulum check valve proper closes against either seat.

Another purpose is to provide means, in a two way hose check valve to prevent the fluid pressure from seeping past the fulcrum of the pendulum valve proper and urge a back pressure on the valve, said means being retained in position by means of the bonnet of the valve casing.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:

Figure 1 is a view of the two-way hose check valve as applied between two pipes, one delivering cold water, the other delivering hot water into the valve casing, there being an outlet pipe with a hose attached thereto, and through which hot or cold water may be discharged or the mixture of both therethrough at one time for the purpose of washing floors and equipment, in such plants as dairies, breweries and soft drink plants.

Figure 2 is a vertical sectional view, showing how the pendulum valve may be easily removed, after the bonnet is detached.

Figure 3 is a detail perspective view of a disc element mounted under the bonnet and into the upper end of the valve casing.

Figure 4 is a sectional view on line 4—4 of Figure 1.

Referring to the drawing, 1 identifies a valve casing proper provided with two opposite axially aligned inlet openings 2 and 3, which are internally threaded at 4, the threads of which are to be engaged by the threads on the adjacent ends of the short pipe sections 5 and 6. The remote ends of the pipe sections 5 and 6 are externally threaded at 7 for threaded engagement into elbows 8. These elbows in turn are connected to pipes 9 and 10, the former of which may carry cold water to the valve casing, the latter of which carrying hot water. The valve casing has an outlet passage 11 internally threaded at 12 for the reception of the threaded end of an outlet pipe section 13, and to which a hose 14 may be connected.

The interior of the valve casing 1 (which may be of any shape and of any size and constructed of any suitable metal) is sufficient for the reception of a check valve proper 15, which is mounted on a pivot pin 16 to swing in simulation to a pendulum, it depending on which direction the fluid in the pipes 9 and 10 is flowing, and in the event that the fluid is flowing in both pipes 9 and 10 with substantial equal pressure the pendulum valve will balance substantially at the center between the two inlets. It is obvious that the pendulum valve is thicker at its lower end, and therefore, heavier at such point.

At opposed positions closer to the center of the interior of the valve casing valve engaging seats 17 are provided. These seats are disposed on diverging angles from the pivot pin 16, and are suitably ground for the purpose of insuring water tight joints when the pendulum valve is closed against either of the seats. The lower part of the pendulum valve is circular and it has an extension 18 at its upper portion. This extension terminates in a cylindrical sleeve 19 for the reception of the pivot pin 16. The upper part of the valve casing has an extension 20, the exterior being cylindrical. However, the interior of the extension 20 has an opening 21, which is substantially oblong transversely of the extension 20, substantially wherein the pivot pin 16 is mounted. The upper end of the extension 20 has a countersink 22 for the reception of a circular boss 23 integral with a disc 24, which rests on the upper end of the extension 20. A bonnet 25 is threaded at 26 on the extension 20 and is adapted to hold the disc 24 on the upper end of the extension 20, with the integral circular boss 23 engaged in the countersink 22. Projecting from the circular boss 23 is a tongue 27 likewise oblong to fit the opening 21. The lower end of this tongue is shaped at 28 to straddle the cylindrical sleeve 19 of the extension 18 of the pendulum valve proper. The ground seats are in align with the opposite diverging walls 29 of the crotch 28 of the tongue 27. By this particular construction and when the pendulum valve is engaged with the left hand ground seat, fluid pressure is prevented from seeping over the cylindrical sleeve 19 to the left hand face of the pendulum valve 15, that is, when the fluid pressure is flowing in the direction of the arrows *a*. When the fluid is flowing in the opposite direction, as indicated by the arrows *b* fluid pressure is prevented from seeping in the opposite direction over the sleeve to the right hand face of the pendulum valve. However, when fluid pressure is flowing in both directions toward each other as indicated by the arrows *a* and *b* the pendulum valve will balance substantially approximately centrally of the valve casing, in which case the hot and cold water or other fluid may mix in passing through the pipe section 13 and through the hose 14.

The extension 20 of the valve casing is provided with diametrically opposite openings 30 internally threaded for the reception of plugs 31, against which the opposite ends of the pivot pin may engage. By removing one or the other or both of the plugs 31 it is possible to extract the pivot pin 16, and then remove the valve through the opening 21.

When water or other fluid is entering either inlet of the valve body the pressure of the fluid or water forces the swing check valve 15 to close against the opposite seat, when only one feed valve of either of the pipes 9 and 10 is open, but when it is desirable to mix hot and cold fluid or water, the pressures can be equalized by adjusting both feed valves of the pipes 9 and 10, and in this event the check valve 15 will balance substantially at the center of the check valve casing. However, in the event that the pressures should become uneven or, the source of supply through one of the pipes 9 and 10 should fail, the stronger pressure of fluid or water would have a tendency to swing the check valve against the opposite seat, thus preventing pressure from backing into the opposite feed pipe.

The invention having been set forth, what is claimed is:

In a two-way hose check valve, a valve casing having diametrically opposite aligned inlets and an outlet extending at right angles from and intermediate the inlets, said valve casing having downwardly divergent valve seats, said valve casing having an extension diametrically opposite the outlet, said extension having a passage adjoining to and extending from the valve seats, a swing check valve fulcrumed in said passage and adapted to close against either of the valve seats, a bonnet on the extension of the valve casing, and a device seated on the extension of the valve casing and held in place by said bonnet and provided with a bifurcated tongue extending into said passage and straddling the pivoted end of the check valve with the walls formed by the bifurcation disposed in alignment with the valve seats and contacted by the check valve when engaging the seats to prevent leakage around the pivoted end of the check valve.

FREDERICK O. SWANLAND.